United States Patent
Forte et al.

(10) Patent No.: US 10,378,203 B2
(45) Date of Patent: Aug. 13, 2019

(54) MINERAL WOOL AND FIBROUS MATERIAL COMPOSITE AND INSULATION FORMED THEREBY

(71) Applicant: Industrial Insulation Group, LLC, Brunswick, GA (US)

(72) Inventors: Don Forte, Springboro, OH (US); Philippe Delouvrier, Brunswick, GA (US)

(73) Assignee: Johns Manville, Denver, CO (US)

(*) Notice: Subject to any disclaimer, the term of this patent is extended or adjusted under 35 U.S.C. 154(b) by 1027 days.

(21) Appl. No.: 13/928,098

(22) Filed: Jun. 26, 2013

(65) Prior Publication Data

US 2014/0004766 A1  Jan. 2, 2014

Related U.S. Application Data

(60) Provisional application No. 61/665,454, filed on Jun. 28, 2012.

(51) Int. Cl.
| | |
|---|---|
| *E04B 1/76* | (2006.01) |
| *D04H 1/4218* | (2012.01) |
| *D04H 3/004* | (2012.01) |
| *C03C 13/06* | (2006.01) |
| *C03C 25/34* | (2006.01) |
| *D04H 1/655* | (2012.01) |
| *E04B 1/74* | (2006.01) |

(52) U.S. Cl.
CPC ............ *E04B 1/7662* (2013.01); *C03C 13/06* (2013.01); *C03C 25/34* (2013.01); *D04H 1/4218* (2013.01); *D04H 1/655* (2013.01); *D04H 3/004* (2013.01); *E04B 2001/746* (2013.01); *Y10T 442/696* (2015.04)

(58) Field of Classification Search
CPC .. E04B 1/7662; E04B 2001/746; D01G 13/00
USPC ............................ 65/442, 456, 475; 19/107
See application file for complete search history.

(56) References Cited

U.S. PATENT DOCUMENTS

| | | | | |
|---|---|---|---|---|
| 5,123,949 A | * | 6/1992 | Thiessen ................. | C03C 25/47 65/450 |
| 5,778,492 A | * | 7/1998 | Thiessen ................ | D01G 13/00 19/107 |
| 2003/0234467 A1 | * | 12/2003 | Yang ........................ | D04H 1/60 264/122 |
| 2005/0130538 A1 | * | 6/2005 | Yang ........................ | C03C 25/24 442/331 |
| 2008/0003431 A1 | * | 1/2008 | Fellinger ............... | E04B 1/7604 428/375 |

OTHER PUBLICATIONS

Dictionary definition of "spray" (retrieved Jan. 10, 2019). (Year: 2019).*

* cited by examiner

*Primary Examiner* — Peter Y Choi
(74) *Attorney, Agent, or Firm* — Robert D. Touslee

(57) ABSTRACT

A method for forming an insulation product based on a composite of mineral wool and another first material comprising the steps of: (1) forming mineral wool fibers using at least one fiberizing device; (2) introducing the first material to the formed mineral wool fibers at a location proximate the fiberizing device to form a first mixture; (3) drawing the first mixture into a collector to form a structure having a predetermined thickness; and (4) subsequently processing the first mixture to form the insulation product, wherein the first material is disposed throughout the insulation product.

12 Claims, 2 Drawing Sheets

MINERAL WOOL AND FIBROUS MATERIAL COMPOSITE AND INSULATION FORMED THEREBY

CROSS REFERENCE TO RELATED APPLICATION

Figure 1:
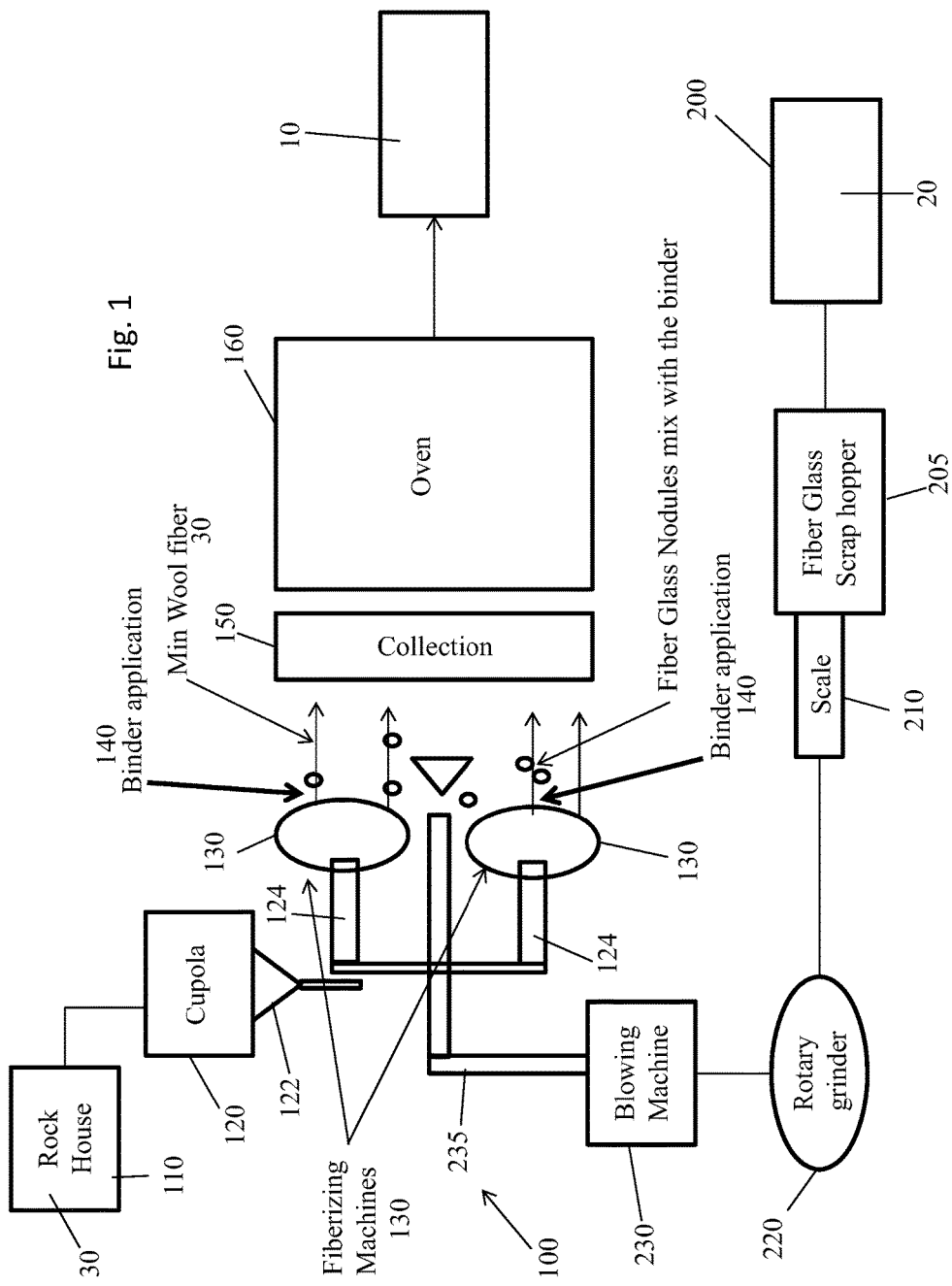

The present application claims priority to U.S. Application Ser. No. 61/665,454, filed Jun. 28, 2012, which is hereby incorporated by reference in its entirety.

TECHNICAL FIELD

The present invention relates to insulation materials and products and more particularly, relates to a mineral wool fiber and fibrous material (e.g. fiberglass) composite product that is particularly suited for use as an insulation product that offers both advantageous fire-proof properties and thermal conductivity values.

BACKGROUND

In many industries, it is commonplace to provide thermal insulation for pipe and equipment to prevent heat loss or gain. There are a variety of insulation products that are conventionally used in the industry depending upon a number of parameters including the particular application for the product. Mineral wool is among the most frequently employed materials in thermal protection, noise control and fire-proofing applications. This is due to the fact that, on the one hand, mineral wool has excellent insulating characteristics and, on the other, is non-combustible (its melting point is above 1000° C.), water repellent, resistant to ageing and can be easily processed. The base material used for mineral wool is rock, such as for example basalt and dolomite as well as quartz sand and other mineral aggregates.

Mineral wool products generally comprise mineral fibers bonded together by a cured thermoset polymeric material. One or more streams of molten glass, slag or stone (at temperatures ranging between 1300° C. and 1600° C.) are drawn into fibers and blown into a forming chamber where they are deposited as a web on to a travelling conveyer. The fibers, while airborne in the forming chamber and while still hot are sprayed with a binder. The coated fibrous web is then transported from the chamber to a curing oven where heated air is blown through the mat to cure the binder and rigidly bond the mineral wool fibers together. The final products are commonly insulating boards used for thermal insulation, sound- and fire-proofing purposes.

While mineral wool possesses a number of advantageous properties, including its fire-proofing properties, it has an inferior thermal properties compared to competing products, such as fiberglass insulation. One common method for describing the thermal properties of insulation is by referencing its "R-value". The R-value is a measure of thermal resistance used in the building and construction industry. Under uniform conditions it is the ratio of the temperature difference across an insulator and the heat flux. The R-value is thus a measure of insulation's heat loss retardation under specified test conditions. The primary mode of heat transfer impeded by insulation is conduction but unavoidably it also impedes heat loss by all three heat transfer modes: conduction, convection, and radiation. The primary means of heat loss across an uninsulated air-filled space is natural convection, which occurs because of changes in air density with temperature. Insulation greatly retards natural convection making the primary mode of heat transfer conduction.

Recently, the Department of Energy has developed new insulation guidelines. These are minimum standards and set forth a minimum R-value for a given particular location.

It is therefore desirable to produce an insulation product thus offers the fire-proofing properties of mineral wool but also has improved thermal properties.

SUMMARY

In accordance with one embodiment, a mineral wool and fiberglass composite insulation product formed by the process comprising the steps of: (1) generating mineral wool fibers using at least one fiberizing device; (2) pre-processing recycled fiberglass material to form fiberglass nodules of pre-selected size; (3) delivering the fiberglass nodules to a location proximate the at least one fiberizing device to cause the fiberglass nodules to mix with the mineral wool fibers to form a first mixture that is subsequently received within a collector that allows a structure formed in the collector to have a predetermined thickness; and (4) processing the first mixture to form the mineral wool and fiberglass composite insulation product.

In another embodiment, an insulation product is formed by the process comprising the steps of: (1) generating mineral wool fibers using at least one fiberizing device; (2) pre-processing recycled material that is formed substantially of a first material to form nodules of pre-selected size; (3) delivering the nodules to a location proximate the at least one fiberizing device to cause the nodules to mix with the mineral wool fibers to form a first mixture that is subsequently received within a collector that allows a structure formed in the collector to have a predetermined thickness; and (4) processing the first mixture to form the insulation product. The first material is selected from the group consisting of E-glass fibers, fiberglass, and cellulose, perlite and vermiculite.

In another aspect, a method for forming an insulation product based on a composite of mineral wool and another first material comprising the steps of: (1) forming mineral wool fibers using at least one fiberizing device; (2) introducing the first material to the formed mineral wool fibers at a location proximate the fiberizing device to form a first mixture; (3) drawing the first mixture into a collector to form a structure having a predetermined thickness; and (4) subsequently processing the first mixture to form the insulation product, wherein the first material is disposed throughout the insulation product.

BRIEF DESCRIPTION OF DRAWING FIGURES

Figure 2:
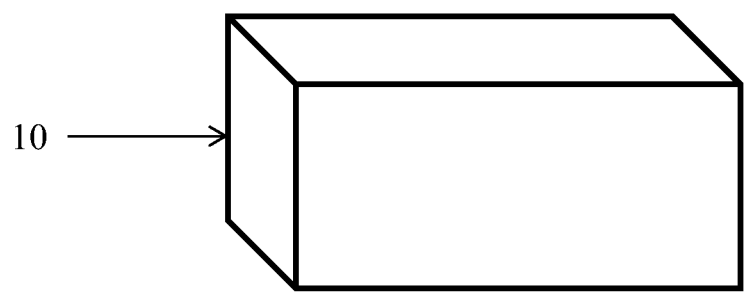

FIG. 1 is a schematic showing a system for producing a mineral wool and fiberglass composite product in accordance with the present invention; and FIG. 2 is a perspective view of an exemplary insulation product manufactured in accordance with the present invention.

DETAILED DESCRIPTION OF CERTAIN EMBODIMENTS

Previously, mineral wool products were recycled by taking recycled mineral wool scrap and introducing this scrap material back in to the mineral wool manufacturing system at a non-binding location (i.e., downstream of where binder is introduced and where the mineral wool fibers bond together by means of the binder). Unfortunately, while some success was achieved by such recycling effort, there were a number of manufacturing issues and also a number of issues with the resulting product. More specifically, the mineral wool scrap material did not sufficiently bond (adhere) with the virgin mineral wool material resulting in this mineral wool scrap material becoming dislodged from the mineral wool product. In other words, the mineral wool scrap migrates out of the insulation product. This results in a shoddy product and does not fully achieve the goal of recycling the mineral wool scrap material.

The present invention addresses and overcomes this issue and provides a system and process, whereby recycled waste material can be used in the formation of insulation products that possess improved properties and also have improved integrity as a result of the improved binding between the recycled material and the other materials used to form the insulation product.

FIG. 1 illustrates a system 100 for manufacturing an insulation product 10, such as an insulation mat or the like. The product 10 can be in the form of a cut insulation product having a predetermined thickness and shape.

In accordance with the present invention, one material 20 is used in the manufacture of the product 10 and the material 20 can be in the form of a recycled material. In one embodiment, the recycled material 20 is in the form of scrap material such as trim or edge material that is generated when a different product formed of material 20 is cut to size or otherwise processed. This recycled material 20 is collected at the manufacturing site and can be transported to a different location for manufacture of the product 10. It will be appreciated that the location at which the recycled material 20 is both formed and collected can be remote from the manufacturing of the product 10 and can require ground transportation to get from one location to the other location. Alternatively, the two locations can be proximate one another.

It will be appreciated and understood that the material 20 is not limited to being recycled material and instead the material 20 can be a first quality (non-recycled) product, such as first quality fiberglass insulation.

The product 10 is also formed of a first material 30 as described in detail below. In accordance with present invention, the recycled material 20 is different than the first material 30; however, it is within the scope of the present invention that the recycled material 20 can be the same as the first material 30. In one embodiment, both the recycled material and the first material 30 are fibrous materials and in particular, the first material 30 is in the form of a material that is at least substantially formed of mineral wool (e.g., the first material 30 can be mineral wool).

The recycled material 20 is formed of a different fibrous material that is suitable for use in an insulation product and can be combined and integrated with the first material 30. The fibrous material 20 can be any number of different materials including but not limited to fiberglass, E-glass fibers, cellulose fibers, etc.

As described in detail below, when the recycled material 20 is in the form of fiberglass, the combination of recycled fiberglass 20 with mineral wool (the first material 30) yields a composite insulation product that has improved properties compared to insulation products that are only made of mineral wool. More specifically, the composite product 10 possesses advantageous fire-proofing properties and also possesses improved thermal insulation properties (i.e., increased R-value) compared to homogenous mineral wool products.

The system 100 includes a first source 110 of the first material 30 (the first material 30 can be pre-processed at the location 110). In the case of the first material 30 being mineral wool, the first source 110 can be in the form of a rock house or the like. As discussed herein, mineral wool generally refers to man-made fibers and in particular refers to (1) rock wool which is made from mineral fibers manufactured from waste from mining and volcanic rock. The materials are melted in furnaces and blown with air or steam over spinning drums or a centrifuge to create the fibers; and (2) slag wool which is made by the same process from fibers created from blast furnace slag. The rock house 110 is thus a location at which raw materials used to form mineral wool are contained.

The system 100 also includes a cupola 120 that is designed to receive the raw materials from the rock house 110. The cupola 120 can be directly connected to the rock house 110 via a transporting device, such as a conveyor, etc.

As is understood by one of skill in the art, mineral wool cupolas 120 are constructed for the melting of silica containing slag and rock material and other siliceous materials (from rock house 110) to form a melt which can then be formed into elongated fibers useful for insulation and the like. Typically, the cupola 120 takes the form of unlined, or so-called self-lining, steel cupolas which receive a charge at the top and from which molten siliceous material is tapped from the bottom. After tapping, the molten siliceous product is commonly either centrifugally or pneumatically attenuated into long fibers, while the siliceous material is still molten as described herein. The resulting fibers are useful for insulation and the like.

Mineral wool cupolas 120 are customarily charged with alternating layers of siliceous materials and coke. The siliceous materials may comprise various metallurgical furnace slags plus siliceous or silica containing rock such as trap rock. The coke is ignited in the lower portion of the cupola and is burned by air and/or oxygen admitted through tuyeres in the walls near the bottom of the cupola. The heat melts the siliceous materials into a homogenous composition that can be formed into fibers. Since the siliceous material is not corrosive to the walls of the cupola, the walls are customarily not lined, but are self-lined by a thin layer of the chilled melt particularly against the water cooled walls of the hearth area. The bottom, or hearth, of the cupola usually has a layer of loam or clay material applied to it to protect the hearth from the molten charge and particularly from attack by residual molten metals which collect in the center of the hearth and are periodically tapped from the bottom of the furnace. It will be understood that the above described cupolas 120 are merely exemplary in nature and any number of cupola constructions can be utilized to product the molten material that is then turned into fibers.

The cupola 120 has an outlet or exit 122 which can lead to one or more conduits 124 that deliver the molten material to the next station of the system 100. As is known in the industry, the outlet 122 can be in the form of a water-cooled trough and the conduits 124 lead to one or more fiberizing device (apparatus) 130. The fiberizing apparatus 130 is intended to convert the molten mineral charge that exits the cupola 120 into fibers. Most mineral wool is made by one of two methods or variation thereof. The first process (Powell process) uses groups of rotors revolving at a high rate of speed to form the fibers. Molten material is distributed in a thin film on the surfaces of the rotors and is then thrown off by centrifugal force. As the material is discharged from the rotor, small globules develop on the rotors and form long, fibrous trails as they travel horizontally. Air or steam can be blown around the rotors to assist in fiberizing the material. A second fiberization method (the Downey process) uses a spinning concave rotor with air or stem attenuation. Molten material is distributed over the surface of the rotor from which it flows up and over the edge and is captured and directed by a high-velocity stream of air or steam. During the spinning process, not all globules that develop are converted into fiber. The nonfiberized globules that remain are referred to as "shot".

In the illustrated embodiment, there are two fiberizing devices 130 that are spaced apart from one another with one conduit 124 leading to one respective fiberizing device 130.

Depending upon the desired product, various chemical agents can be applied to the newly formed fiber immediately following (or directly at) the rotor. For example, the device 120 itself (rotor) can have integral openings that discharge chemical agent onto the newly formed fibers. If the mineral wool is to have structural integrity (rigidity), as in batts and industrial felt, a binding agent is applied. The binder is typically a phenol-formaldehyde resin that requires curing at elevated temperatures. The binder is applied by atomizing the liquid (binder) and spraying the agent to coat the airborne fiber. In FIG. 1, the application of binder is generally shown at legend 140.

After formation and chemical treatment, the fiber is collected in a collector 150 (e.g., a blowchamber) and the fibers are drawn down on a conveyor (e.g., wire mesh conveyor) by negative pressure (e.g., fans under the conveyor). The speed of the conveyor is set so that a structure (blanket) of desired thickness can be obtained.

The fibrous product on the conveyor is then delivered to a curing oven 160 where the fibrous product is compressed to the appropriate density and the chemical agent (binder) is baked. Hot air (e.g., at a temperature of around 300° F. and 600° F.) is forced through the fibrous material (blanket) until the binder has set. Curing time and temperature depend on the type of binder used and the mass rate through the oven 160. A cooling section follows the oven 160, where blowers force air at ambient temperature through the fibrous material (blanket).

To make batts and industrial felt products, the cooled fibrous material (blanket) is cut longitudinally and transversely to the desired size.

As previously mentioned and in accordance with the present invention, recycled material 20 is mixed with the first material 30 to form the final product 10. One exemplary product 10 comprises a composite product formed of first material 30 in the form of mineral wool fibers and recycled fiberglass 20. As shown in FIG. 1, the recycled material 20 can be in the form of fiberglass scrap material (i.e., waste material, such as trim, created when a fiberglass product is made). A source 200 of the recycled material 20 is thus provided. Initially, the scrap fiberglass is pre-processed through a first device, such as a hammer mill or other device, to break fiberglass batt and rolls into nodule size.

The nodules are fed to a hopper 205 where the nodules are metered out and continuously weighed using a weighing device (scale) 210 to ensure that the proper amount of recycled material 20 is added to the first material 30.

From the weighing device 210, the recycled material 20 is then delivered to an apparatus 220 (using a conveyor) for reducing the size of the recycled material 20. For example, the apparatus 220 can be in the form of rotary grinder that grinds the recycled material (scrap) into smaller pieces. After the recycled material 20 is ground into smaller pieces (smaller nodules), the recycled material 20 is delivered to a blowing machine 230. The nodules can be gravity fed to the blowing machine 220 and the blowing machine 220 meters the flow of fibers into an air stream that flows within a conduit 235. The conduit 235 delivers the ground recycled material (nodules) 20 to a selected target location where the ground recycled material 20 is introduced and combined with the loose mineral wool fibers (first material 30).

As shown in FIG. 1, the conduit 235 is disposed between two fiberizing devices 130 prior to the collector 150. The conduit 235 is thus positioned at a location where the (coated) mineral wool fibers are generated yet prior to the mineral wool fibers 30 being drawn to the conveyor in the collector 150. The ground recycled fiberglass nodules 20 are thus mixed with the binder and with the mineral wool fibers 30 to form a fiber mixture that is drawn into the collector 150. The fibers are thus blown and directed toward the collector (collection hood) in close proximity to the mineral wool fibers being generated from the fiberizing devices (spinning machines). The nodules 20 mix with the binder and the mineral wool fibers and are collected onto a drum or chain that is part of the collector.

The recycled fiberglass 20 is dispersed throughout the product 10. In particular, the fiberglass 20 is randomly dispersed throughout the entire (composite) product 10.

The present invention offers a number of advantages including but not limited to the following. First, the resulting composite product 10 has increased "R-value" relative to conventional mineral wool products as mentioned herein and due to the presence of fiberglass which has increased R-value. The system 100 also for recycling of waste fiberglass and thus, the resulting product 100 includes recycled content. The resulting product 100 has a more uniform product density and feel and also, the system 100 also for a reduction in costs.

Example

In one embodiment, the weight range of the recycled material (e.g., fiberglass) can be from about 0-60% by weight of the product. For example, the insulation product 10 can be formed of about 10% to about 40% of fiberglass by weight; or can be formed of about 20% to about 40% of fiberglass by weight; or can be formed of about 20% to about 30% of fiberglass by weight. It will be appreciated that these ranges are merely exemplary and not limiting of the present invention since the weight percentages of the relative components can vary depending upon the intended application and also on the fibrous material used.

It will be appreciated that while the other material that is combined with mineral wool fibers is preferably in the form of recycled material, other materials that are not recycled can be used. In addition, other materials that increase the R-value of the final composite product and are suitable for use in insulation products can be used.

Unlike other insulation products formed as a composite, the present invention discloses a "dry" process in that the mineral wool fibers and the other fibrous material combined with the mineral wool fibers are in dry fibrous form when combined to form the mixture that is then processed into an insulation product. For example, the components of the mixture can be bonded together using a binder that is introduced at the point of combination and then is subsequently cured to form the bound structure. The recycled raw material is dry and as mentioned can be processed at another remote location and can be transported to the location where the fiberization and formation of the mineral wool fibers occurs.

What is claimed is:

1. A method for forming an insulation mat product based on a composite of mineral wool and a first material comprising the steps of:
   forming mineral wool fibers using at least one fiberizing device;
   processing the first material to form nodules of the first material of a first preselected size;
   metering and weighing the nodules of the first preselected size;
   subsequent to metering and weighing the nodules of the first preselected size, processing the nodules of the first preselected size to form nodules of a second preselected size, the second preselected size being different than the first preselected size;
   introducing the nodules of the second preselected size to the formed mineral wool fibers at a location proximate the fiberizing device to form a first mixture, wherein the nodules of the second preselected size are introduced to the formed mineral wool fibers so that the insulation mat product includes between about 10% and 40% by weight of the nodules of the second preselected size;
   drawing the first mixture into a collector to form a structure having a predetermined thickness; and
   subsequently processing the first mixture to form the insulation mat product, wherein the nodules of the second preselected size are disposed throughout the insulation product;
   wherein the mineral wool fibers and the nodules of the second preselected size are in a dry form when combined to form the first mixture.

2. The method of claim 1, further including the step of adding a binder to the first mixture and the step of processing the first mixture comprises the step of introducing the structure into an oven for curing of the binder to form the insulation product being a bonded mass defined by mineral wool fibers and the first material.

3. The method of claim 1, wherein the first material comprises a recycled fibrous material.

4. The method of claim 3, wherein the recycled material is fiberglass.

5. The method of claim 3, wherein there are least two fiberizing devices and the nodules of the second preselected size are introduced between the fiberizing devices.

6. The method of claim 1, wherein the insulation mat product is formed of between about 20% and 40% of the nodules of the second preselected size.

7. The method of claim 6, wherein the insulation mat product is formed of between about 20% and 30% of the nodules of the second preselected size.

8. A method for forming an insulation mat product based on a composite of mineral wool and a first material comprising the steps of:
   forming mineral wool fibers using at least one fiberizing device;
   processing the first material to form nodules of the first material of a first preselected size;
   metering and weighing the nodules of the first preselected size;
   subsequent to metering and weighing the nodules of the first preselected size, reducing a size of the nodules of the first preselected size to a second preselected size, the second preselected size being different than the first preselected size;
   introducing the nodules of the second preselected size to the formed mineral wool fibers at a location proximate the fiberizing device to form a first mixture, wherein the nodules of the second preselected size are introduced to the formed mineral wool fibers so that the insulation mat product includes between about 20% and 30% by weight of the nodules of the second preselected size;
   drawing the first mixture into a collector to form a structure having a predetermined thickness; and
   subsequently processing the first mixture to form the insulation mat product, wherein the nodules of the second preselected size are disposed throughout the insulation product;
   wherein the mineral wool fibers and the nodules of the second preselected size are in a dry form when combined to form the first mixture.

9. The method of claim 8, further including the step of adding a binder to the first mixture, wherein the binder is in a liquid form when added to the first mixture, and wherein the step of processing the first mixture comprises the step of introducing the structure into an oven for curing of the binder to form the insulation product being a bonded mat defined by mineral wool fibers and the first material.

10. The method of claim 9, wherein the binder is added to the first mixture by atomizing the binder and applying the atomized binder to coat at least the mineral wool fibers.

11. The method of claim 1, wherein processing the nodules of the first preselected size to form nodules of the second preselected size comprises reducing a size of the nodules of the first preselected size to the second preselected size.

12. The method of claim 1, further comprising metering the nodules of the second preselected size.

* * * * *